UNITED STATES PATENT OFFICE.

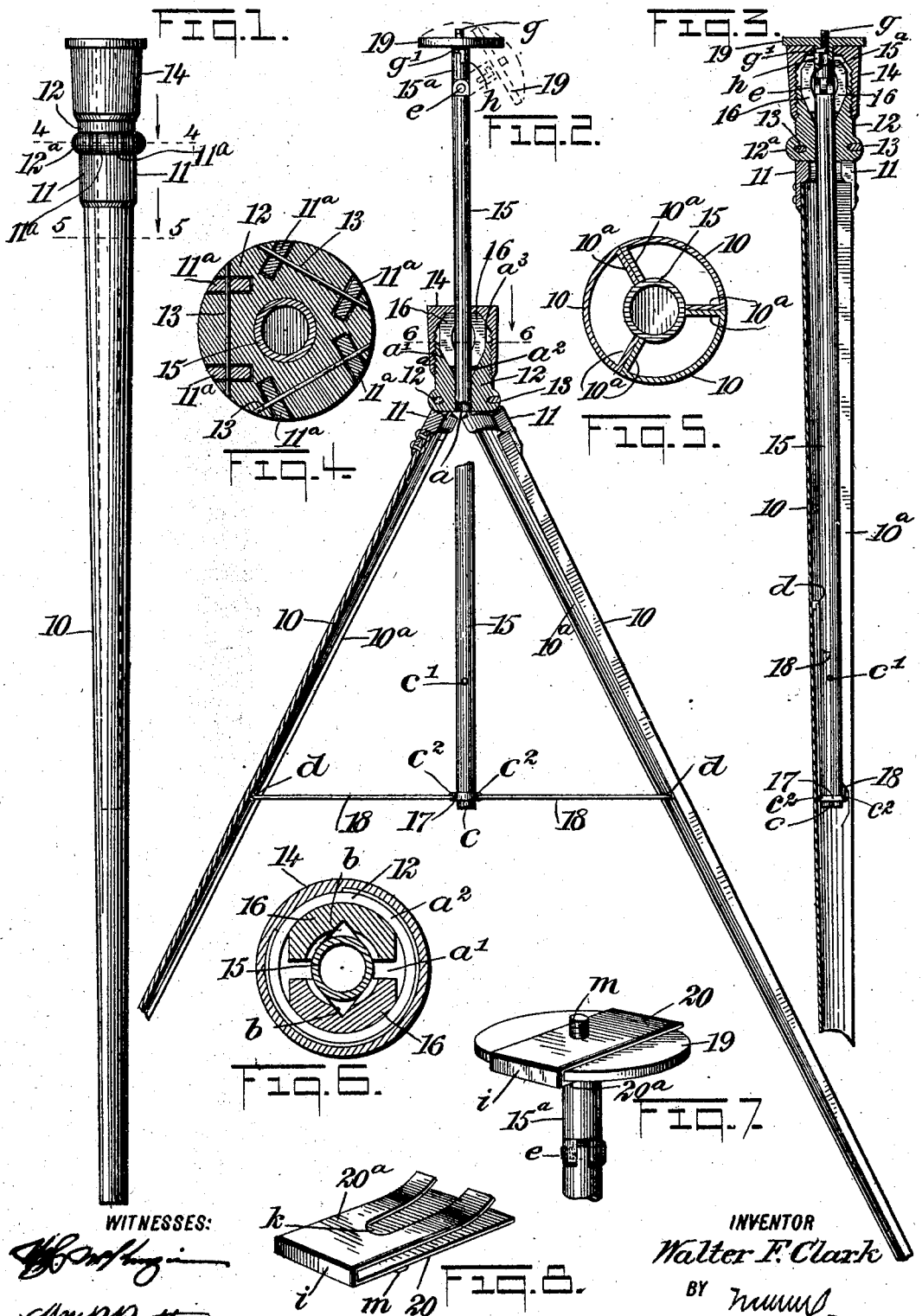

WALTER FRANKLIN CLARK, OF ST. LOUIS, MISSOURI.

COMBINED CANE AND TRIPOD.

No. 806,522.          Specification of Letters Patent.          Patented Dec. 5, 1905.

Application filed February 10, 1905. Serial No. 245,099.

*To all whom it may concern:*

Be it known that I, WALTER FRANKLIN CLARK, a citizen of the United States, and a resident of St. Louis, in the State of Missouri, have invented a new and Improved Combined Cane and Tripod, of which the following is a full, clear, and exact description.

The object of this invention is to provide novel details of construction for a tripod which enable it to be very closely folded and when folded simulate the form of a walking-cane, a further object being to provide a vertically-adjustable standard that is contained within the tripod-legs when they are closely folded together and which may be extended therefrom to add to the height of the tripod, the extension of the standard serving to diverge the legs of the tripod and hold them spread apart a desired distance, the standard having a bracket-plate on the upper end which is both rotatable and inclinable, so that the improved tripod may be employed for the support of a camera or serve as a music-supporting stand.

To these ends the invention consists in the novel construction and combination of parts, as is hereinafter described, and defined in the appended claims.

Reference is to be had to the accompanying drawings, forming a part of this specification, in which similar characters of reference indicate corresponding parts in all the views.

Figure 1 is a side view of the device having the legs closed and forming a walking-cane. Fig. 2 is a partly-sectional elevation of the device with the legs diverged to produce a tripod, the lower portions of the two legs shown being removed. Fig. 3 is a longitudinal sectional view through the center of the device, showing the parts folded. Fig. 4 is an enlarged transverse sectional view showing the hinged connections of the legs of the tripod with the coupling-head, substantially on the line 4 4 in Fig. 1. Fig. 5 is an enlarged transverse sectional view substantially on the line 5 5 in Fig. 1. Fig. 6 is an enlarged transverse sectional view substantially on the line 6 6 in Fig. 2. Fig. 7 is an enlarged perspective view of the upper portion of a camera-support employed in connection with the tripod, and Fig. 8 is an enlarged perspective view of a bracket clip-plate employed.

There are three similar legs provided as the principal members of the improved tripod. These legs, that are preferably formed of steel plate cut and bent into shape by proper means, each represents the one-third portion of a tapered tube, of which 10 is the segmental side wall, and $10^a$ the inwardly-trending stiffening-wings formed integrally therewith, said wings on the legs having contacting pairs when the legs are completely folded together, as shown in Fig. 5. This folded adjustment gives the exterior surface of the legs a conico-cylindrical form—that is, the conventional shape of a walking-cane—and the length of said legs is proportioned to permit them when folded to serve as a cane. It will be seen that although the legs 10 $10^a$ of the tripod are formed of thin sheet-steel the provision of the inwardly-radial wings $10^a$ on the segmental wall 10 of a leg greatly stiffens the legs, so as to adapt them for reliable service.

Upon the upper end of each sheet-metal leg a hinge-block 11 is secured by rivets or screws, and these similar hinge-blocks, that are preferably formed of aluminium metal, are segmental in cross-section and each provided with two hinge-leaves $11^a$, that are spaced apart and project in parallel planes from the upper end of the block-body.

A coupling-head 12, having a mainly-cylindrical body formed of aluminium metal and preferably provided with a circumferential bead $12^a$ on its lower end, is longitudinally slotted from the normally lower end upward at six points, so spaced apart that the tongues or hinge-leaves $11^a$ may be inserted therein and all these hinge-leaves be pivoted upon the coupling-head by means of pintle-bolts 13, that are respectively inserted in alined perforations formed in the adjacent portions of the head 12 and respective pairs of leaves $11^a$, and it will be seen that the hinged connections of the legs permits them to be diverged at their lower ends or folded so as to give them conico-cylindrical form exteriorly. The coupling-head 12 is longitudinally and centrally perforated of a suitable diameter, and for a portion of its length said perforation $a$ is enlarged from its upper end downward, as appears at $a'$ in Fig. 2. The outer surface of the coupling-head 12 is threaded for reception of a cap-nut 14, which may be freely screwed thereon. A preferably tubular metal standard 15 is fitted to slide in the perforation $a$ and also through an alined perforation in the cap portion of the nut 14, so that the standard may be reciprocated in the coupling-head 12. The counterbore $a'$ in the coupling-head 12 is rendered coniform in its lower portion, as at $a^2$, and the interior surface of the cap portion of the nut 14 is beveled at the corner above the internal thread of the nut, as shown at $a^3$ in Fig. 2.

In the counterbore $a'$ two clutch-blocks 16 are fitted loosely, these similar blocks having opposite preferably V-shaped channels $b$ in their adjacent faces, which will receive the body of the standard 15, the blocks being suitably spaced apart when in contact with the standard. The convexed outer faces of the blocks 16 are rendered coniform on their lower portions to conform with the coniform inner wall $a^2$ of the lower portion of the coupling-head 12, and their upper outer corners are beveled to have a proper bearing upon the beveled surface $a^3$ of the cap-nut 14. It will be seen that if it is desired to secure the standard 15 at any point of sliding adjustment in the coupling-head 12 this may be readily effected by screwing the cap-nut 14 downward, as this will press upon the beveled ends of the clutch-blocks 16 and force them toward each other, thus clamping the standard upon the coupling-head.

A runner-band 17 is loosely mounted upon the portion of the standard 15 extending below the coupling-head 12 and is prevented from displacement at the lower end of the standard by an abutment-pin $c$, which projects from the latter near said lower end. A set of three stretcher-rods 18 is employed for the connection of the band 17 with the legs of the tripod, said rods having one end of each hinged, as at $c^2$, upon the runner-band at equal distances apart, their opposite ends being jointed upon the inner sides of the legs, preferably by a pivoted engagement of said ends with short ears $d$, that respectively project from the inner surface of the segmental wall 10 of each leg at its transverse center. The length of the rods 18 and the points of their connection with the legs of the tripod adapt the rods to hold the legs spread apart a suitable degree when said stretcher-rods are projected in the same plane at right angles to the axis of the standard 15, as is shown in Fig. 2, the runner-band being positioned near to or in contact with the abutment-pin $c$ at this time and the standard 15 elevated its full height, as appears in said figure. At a proper point above the abutment-pin $c$ another abutment-pin $c'$ is projected from the standard 15, the use of which will presently appear.

Upon the upper end of the standard 15 a short arm $15^a$ is jointed by an adjustable pivot-bolt $e$, which will so clamp the jaws of the slot-and-tongue joint as to hold the arm at any desired inclination from alinement with the standard. A bracket-plate 19 is secured upon the upper end of the arm $15^a$, and through the center of said plate a threaded bolt $g$ is passed down into the tubular standard, the bolt having a toe $g'$ projected from its side near the lower end thereof, the toe entering a slot $h$ in the wall of the standard, said slot being in the form of an inverted L, the lateral extension of which is at a point near the bracket-plate. It will be seen that if the threaded end of the bolt $g$ is drawn upward and the toe $g'$ is turned into the lateral portion of the slot $h$ said bolt will be sufficiently projected above the bracket-plate for connection therewith of the usual nut in the bottom of a camera, so as to hold the camera on the bracket-plate.

In some cases it may be preferred to make a quicker connection with and effect an instant detachment of the camera to and from the upper portion of the tripod. To this end a bracket clip-plate 20 is employed, the construction and application of which is clearly shown in Figs. 7 and 8. The clip-plate 20 is formed of a rectangular plate of spring metal which at the longitudinal center is return-bent, as appears at $i$, thus providing two spaced members, one member being flat and the other member $20^a$ curved at the free end, so as to bend it away from the flat member. The clip-plate member $20^a$ is slotted at the transverse center from the curved free end toward the other end past the center of length, as shown at $k$ in Fig. 8. In the flat member of the clip-plate at its center of length and width a screw-threaded stud $m$ is affixed, which projects sufficiently therefrom to adapt it to engage with a threaded perforation in the bottom wall of a camera. When the clip-plate 20 $20^a$ is to be employed for the detachable connection of a camera with the bracket-plate 19, the stud $m$ is first screwed into a suitable nut in the bottom wall of the camera, thus attaching it thereto. The stud-bolt $g$ is turned in the transverse member of the slot $h$, so that it enters the vertical portion of the slot, which will permit the depression of the bolt $g$ sufficiently to allow the bracket clip-plate member $20^a$ to slide upon the bracket-plate 19, the short projecting portion of the stud-bolt passing into and through the slot $k$, which will connect the camera with the standard-arm $15^a$ and permit the instant detachment of the camera from the same by simply pulling upon it, so as to remove the bracket clip-plate from the plate 19.

It will be seen that as the standard 15 may be turned around if the cap-nut 14 is slightly retracted and the arm $15^a$ is permitted to receive more or less inclination from a vertical plane the camera when mounted upon the standard may be adjusted to take in a desired view, the provision of the jointed arm enabling the correct adjustment of the camera if the tripod is standing on uneven ground and inclined from an upright position.

When the tripod is to be folded so as to cause its legs to have contact and the device assume the form of a cane, this may be readily effected by first removing the camera, then releasing the standard 15 by slackening the cap-nut 14, and finally pressing upon the bracket-plate 19 so as to shove the standard downward. This downward sliding movement of the standard will cause the abutment-stud $c'$ to press upon the runner-band 17, which will flex the joints $c^2$ when the standard is partially depressed, a further sliding movement of the standard serving to fold the stretcher-rods 18 within the legs of the tripod and complete the insertion of the standard therein, as is indicated in Fig. 3. When the standard 15 is fully inserted within the legs of the tripod, the bracket-plate 19 will become seated upon the cap-nut 14, thus affording a top plate for the cane, and the lower ends of the legs may be held banded together detachably by a removable socketed tip or by any other preferred means.

The improved tripod is designed to facilitate the use of a camera by tourists and others where the portage of the usual tripod is burdensome and otherwise objectionable, and it is evident that the device may also be utilized as a movable support for music-sheets or a book, if this is desired.

Having thus described my invention, I claim as new and desire to secure by Letters Patent—

1. In a tripod of the character described, the combination with three plate-metal tapered legs, and a coupling-head hinged upon blocks on the upper ends of the legs, of a cylindrical standard slidable through the coupling-head, a short arm carrying a bracket-plate on one end, and having a joint therein, and a joint connecting said arm with the upper end of the standard, a pair of clutch-blocks loosely held in a chamber within the coupling-head, a cap-nut on the coupling-head adapted to press upon the clutch-blocks and clamp them upon the standard, a runner-band loosely mounted upon the lower portion of the standard, three stretcher-rods pivoted by an end of each upon the runner-band and at opposite ends upon the respective legs, abutment-pins projected from the standard for contacting alternately with the runner-ring, and inclinable means carried upon the upper end of the standard for supporting an object.

2. In a tripod of the character described, the combination with the legs, a coupling-head whereon the legs are hinged, a standard slidable in the coupling-head, and means for clamping the standard upon said coupling-head, of a short arm held to rock upon the upper end of the standard, a bracket-plate secured upon said arm, a threaded bolt vertically adjustable in the bracket-plate and in the standard, means for holding the bolt projected from the bracket-plate, and a bracket-plate securable upon an object and adapted to clasp the bracket-plate which is secured upon the arm of the standard.

In testimony whereof I have signed my name to this specification in the presence of two subscribing witnesses.

WALTER FRANKLIN CLARK.

Witnesses:
  RICH. E. SPACKLER,
  THOS. F. COOK.